United States Patent
Chen

(10) Patent No.: US 6,863,570 B2
(45) Date of Patent: Mar. 8, 2005

(54) MEMORY CARD CONNECTOR

(75) Inventor: Wan-Tien Chen, Taipei (TW)

(73) Assignee: Egbon Electronics Ltd., Tapei (TW)

( * ) Notice: Subject to any disclaimer, the term of this patent is extended or adjusted under 35 U.S.C. 154(b) by 0 days.

(21) Appl. No.: 10/724,600

(22) Filed: Dec. 2, 2003

(65) Prior Publication Data

US 2005/0014405 A1 Jan. 20, 2005

(30) Foreign Application Priority Data

Jul. 16, 2003 (TW) ........................................ 92213026 U

(51) Int. Cl.$^7$ ............................................. H01R 23/70
(52) U.S. Cl. ..................................................... 439/630
(58) Field of Search ................................. 439/159, 607, 439/630, 188

(56) References Cited

U.S. PATENT DOCUMENTS 6,478,591 B1 * 11/2002 Chang ........................ 439/159
6,520,783 B2 * 2/2003 Hsu ............................. 439/157
6,592,385 B1 * 7/2003 Chen ........................... 439/159
6,648,694 B2 * 11/2003 Takamori et al. ........... 439/630
6,655,973 B2 * 12/2003 Ji et al. ....................... 439/159
6,685,490 B1 * 2/2004 Xue et al. .................... 439/159
6,692,277 B2 * 2/2004 Hu et al. ..................... 439/188

* cited by examiner

Primary Examiner—Thanh-Tam Le
(74) Attorney, Agent, or Firm—Dennison, Schultz, Dougherty & MacDonald

(57) ABSTRACT

The present invention relates to a memory card connector comprising an insulation base seat, a shielding shell, a plurality of conductive terminals, a detecting means, a writing-protection detecting, and a card advancing/withdrawing mechanism. The card advancing/withdrawing mechanism has an integral connecting arm, and therefore made simple constituent parts and low manufacturing cost. The present invention is applicable to memory card automatic locating and withdrawing.

6 Claims, 8 Drawing Sheets

MEMORY CARD CONNECTOR

FIELD OF THE INVENTION

The present invention relates to a memory card connector, and particularly to a memory card connector, which can automatically locate and withdraw the memory card. The present invention has the features of compact constituent parts and lower manufacturing cost.

BACKGROUND OF THE INVENTION

In the prior art, as shown in FIG. 1, the memory card connector comprises an insulation main body 2, a shielding shell 3 covering on the insulation main body 2, a plurality of conductive terminals 4 and a card ejection mechanism 5 which are installed between the insulation main body 2 and the shielding shell 3, wherein the plurality of conductive terminals 4 are inserted in the front end of the insulation main body 2 and one end of each conductive terminal 4 is soldered to the electric circuit board. The card ejection mechanism 5 consists of card ejection main body 6, elastic body 7, connecting rod 8 and holding plate 9. A holding arm 10 extends from the front end of the card ejection main body 6. When the memory card is inserted into the connector 1, its front end can press the holding arm 10 and bring the card ejection mechanism 5 to synchronic move forward for locating.

Said prior memory card connector has the following disadvantages:

1. Said card ejection mechanism comprises so many constituent parts that makes big cost, hard assembling and time wasting.
2. When said a plurality of conductive terminals are soldered to the electric circuit board, some of them could be failed, inevitably, and, therefore, furthermore soldered by human labor is needed. However, the soldering by human labor is much difficult because the solder gun must pass through the opening of the shielding shell after the former procedure.
3. In said prior card ejection mechanism, there is a holding arm hanging in the air extends from the front end of it for pressing the memory card. When the memory card is pushed forward, the holding arm is able to cause a tongue that can increase the resistance against the advancement of the memory card. This makes memory card not able to advance and withdraw smoothly.

In order to overcome the mentioned disadvantages of the prior memory card connector, an improved memory card connector is needed.

SUMMARY OF THE INVENTION

The main object of the present invention is to provide a memory card connector, wherein the connecting arm of the connector comprises a guide groove, a long groove, and an elastic plate, and is integrated formed. Hence, the constituent parts are compacted, the cost of the manufacture is lower, and the assembling is easier.

The secondary object of the present invention is to provide a memory card connector, thereby the mutual limitation between the guide groove of the connecting arm and the convex guide block, the memory card can smoothly and automatically be located and withdrawn.

Another object of the present invention is to provide a memory card connector, wherein the rear ends of a plurality of conductive terminals are outside the rear end of the connector, and therefore it is easier to furthermore solder by human labor.

To achieve the objects mentioned, the present invention comprises an insulation base seat, a shielding shell, a detecting means, a writing-protection detecting means, and a card advancing/withdrawing mechanism. Said insulation base seat has a bottom. There are two sidewalls extending upward from the bottom. A rear sidewall connects the corresponding end of the two sidewalls. The front side opposite the rear sidewall is an opening end. A plurality of parallel convex guide blocks is installed on the rear side of the bottom of the insulation base seat. A guide rail and a locating part are installed on one sidewall of the base seat. Said shielding shell cover the upper end of the insulation base seat. One end of each said plurality of conductive terminals is affixed to the convex guide blocks, and the other end protrudes protruding from the rear side of the insulation base seat. Said detecting means is installed on the rear end of the connector for detecting whether the memory card being held or not. Said writing-protection detecting means is installed on one side of the connector for detecting whether the memory card being writing-protection or not. Said card advancing/withdrawing mechanism is installed on the same sidewall of the insulation base seat as the guide rail on. It comprises a connecting rod and a connecting arm. The connecting arm is L-shaped, integrated formed, and consists of a longitudinal part and a transverse part. There is a plurality of guide grooves being formed on the bottom of the transverse part for covering on the convex guide block. A guide groove with a closed loop is formed on the upper end of the longitudinal part of the connecting arm. A long groove is formed on the lower end of the longitudinal part of the connecting arm in such a manner that the guide rail can be linked up and the connecting arm is able to move on the guide rail. An elastic plate extends from one side of the longitudinal part for clamping the memory card and being advanced/withdrawn. The connecting rod is installed over the longitudinal part of the connecting arm. Its two ends are provided with a first and a second locating block, respectively. The first locating block is located at the locating part. The second locating block is installed in the guide groove which is limited by the second locating block so that the connecting arm can be moved along a single cyclical direction during the memory card advancing/withdrawing.

For the present invention being able to be understood completely, it is now described in detail as the following.

DETAILED DESCRIPTION OF THE INVENTION

Figure 1:
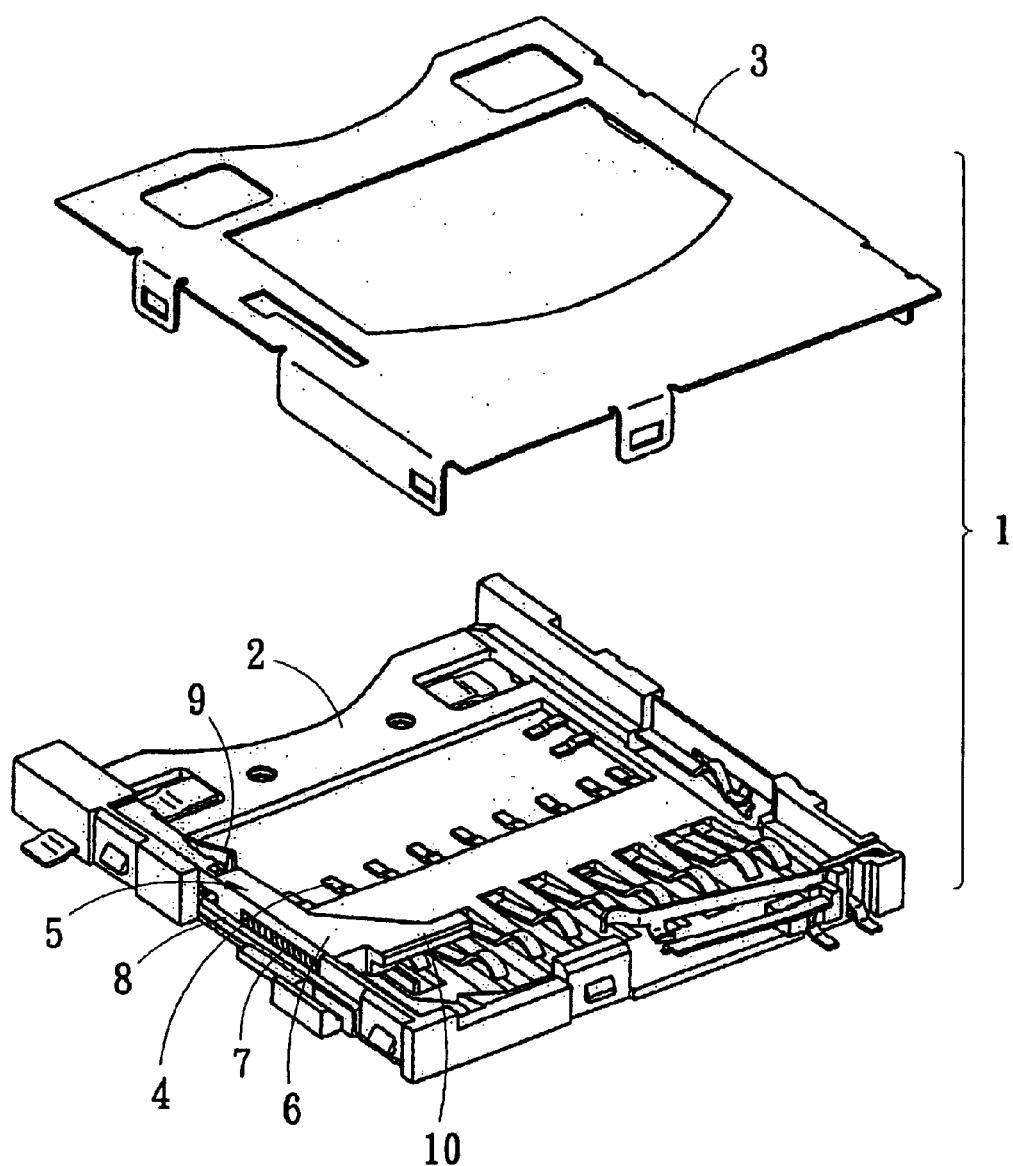
FIG. 1 is an exploded view of a prior memory card connector.
Figure 2:
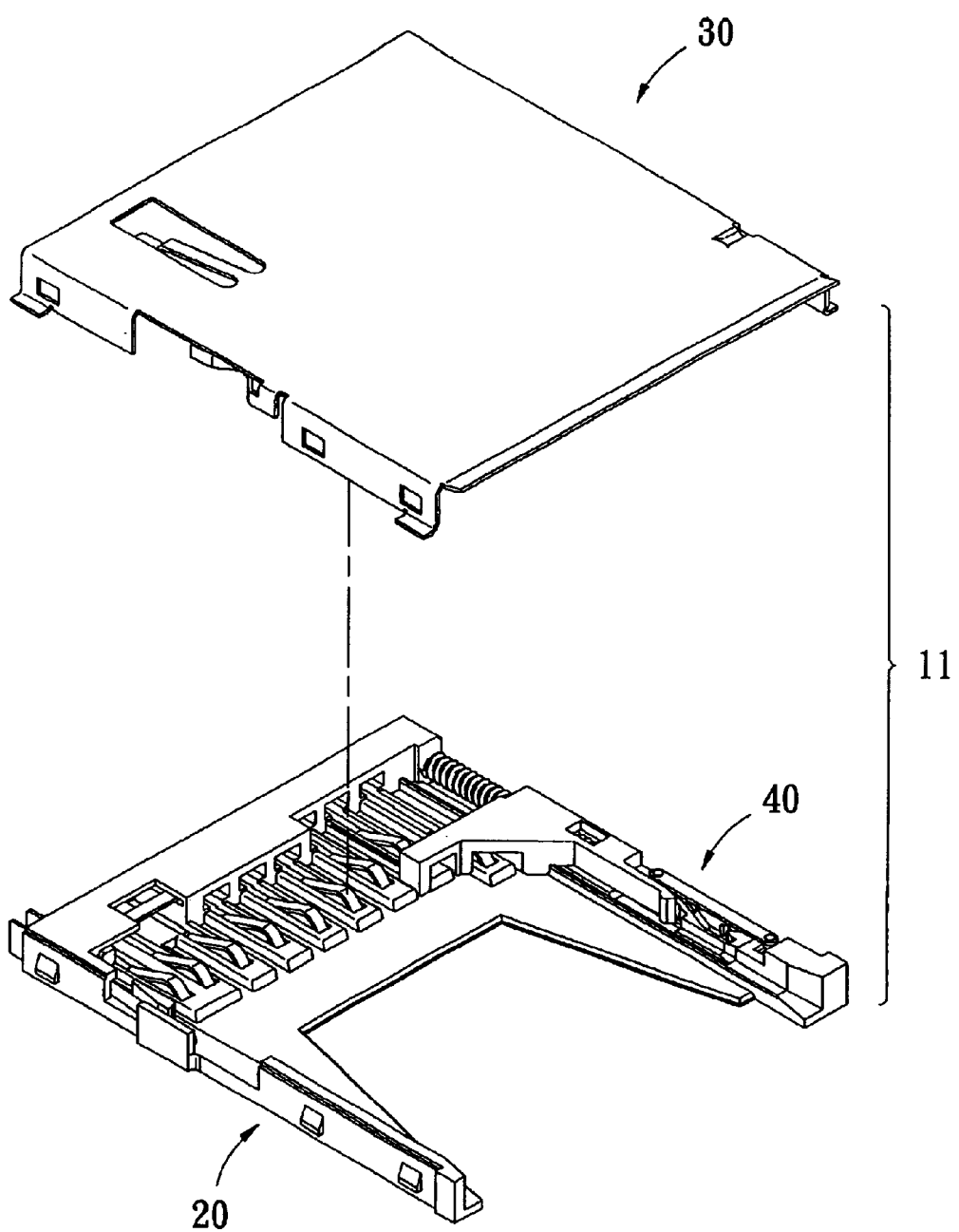
FIG. 2 is an exploded view of a memory card connector of the present invention.
Figure 3:
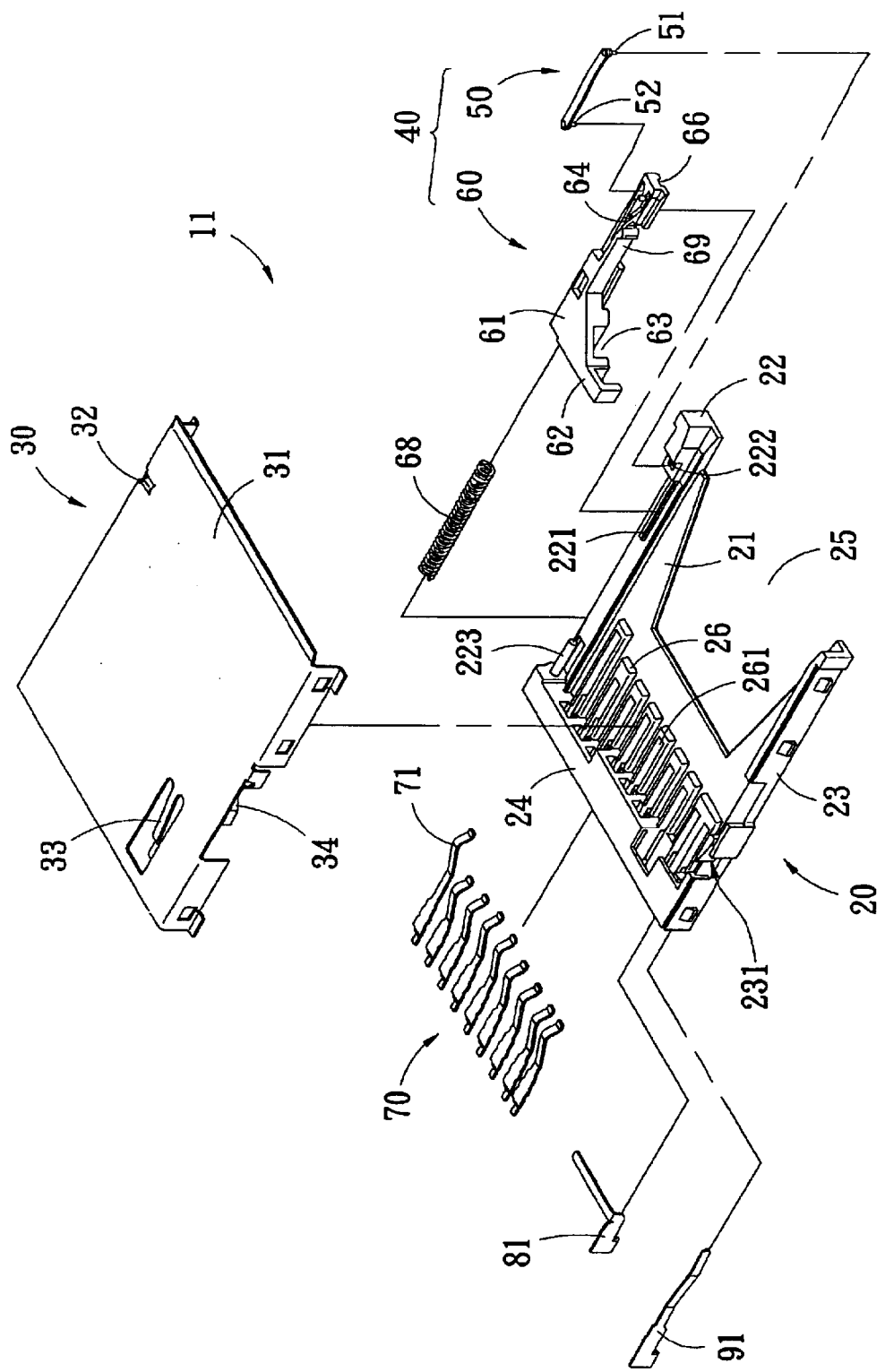
FIG. 3 is another exploded view of a memory card connector of the present invention.
Figure 4:
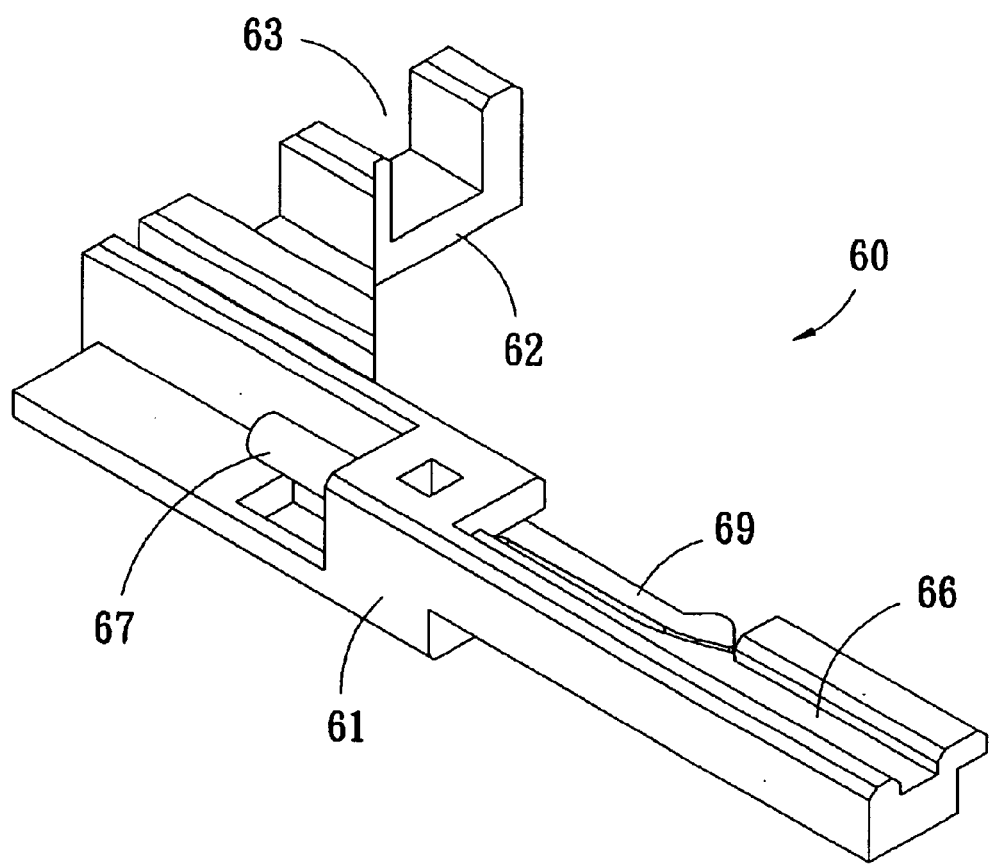
FIG. 4 is an exterior view of the connecting arm of the preferred embodiment of the present invention from another viewing direction.

Referring to FIGS. 2~6 that show a preferred embodiment of the present invention, the memory card connector 11 comprises an insulation base seat 20, a shielding shell 30, a card advancing/withdrawing mechanism 40, a plurality of conductive terminals 70, a detecting means 80, and an writing-protection detecting means 90.

The insulation base seat 20 has a planar bottom 21 with an opening. There are two parallel sidewalls (22, 23) extend upward from the left and the right end of the bottom 21. A rear sidewall 24 connects the corresponding end of the two sidewalls (22, 23). The front side opposite to the rear sidewall 24 is an opening end 25. A plurality of convex guide blocks 26 are parallels installed on the rear side of bottom 21 of the insulation base seat 20. A receiving groove 261 is formed in each convex guide block 26. There are a guide rail 221 and a downward stepped recess used as a locating part 222 installed on one end of a sidewall 22 of the insulation base seat 20, and there is a fixing rod 223 installed on the other end of the same sidewall. An opening (not shown in figures) for fixing the detecting plate 81 of the detecting means 80 is formed on the rear sidewall 24 of the base seat 20. On the other sidewall 23 of the base seat 20 there is a holding part 231 for holding the detecting terminal 91 of the writing-protection detecting means 90.

The shielding shell 30 can cover the insulation base seat 20. It is a planar plate 31 with some thickness and has two sides bent downward. There are a recess 32 and a detecting press plate 33. The detecting press plate 33 and the said detecting plate 81 are installed in a detecting means 80 for detecting whether the memory card being at exact location or not.

There is a detecting elastic plate 34 for writing-protection on one bent side of the planar plate 31. The detecting elastic plate 34 and the said detecting terminal 91 are installed in a detecting means 90 for detecting whether the memory card being at the writing-protection state or not.

Figure 5:
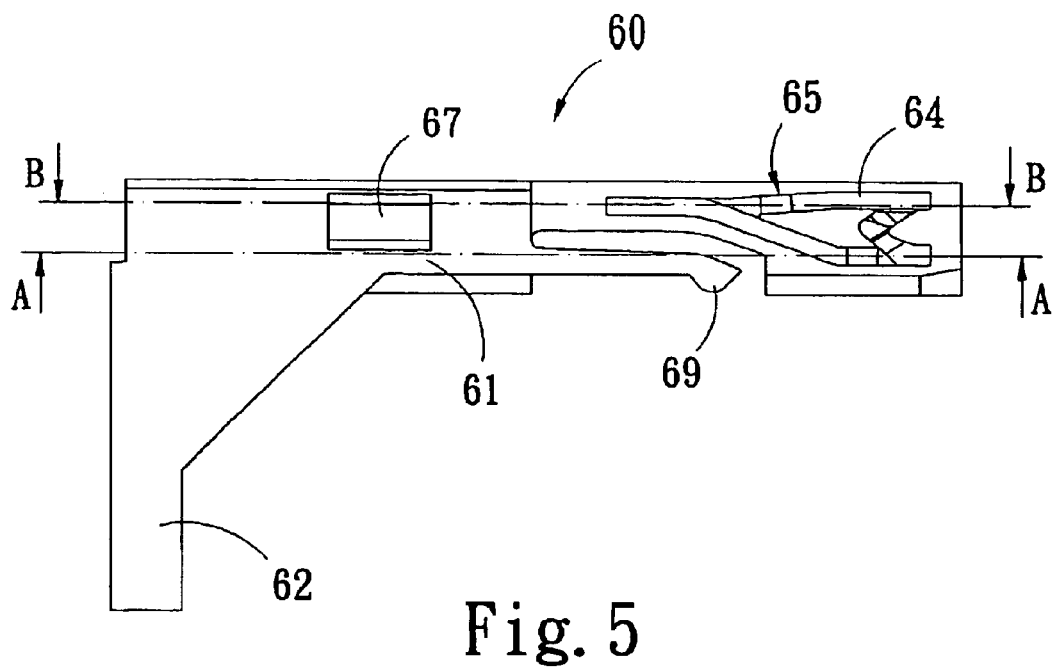
FIG. 5 is a top view of the connecting arm of the preferred embodiment of the present invention.
Figure 5A:
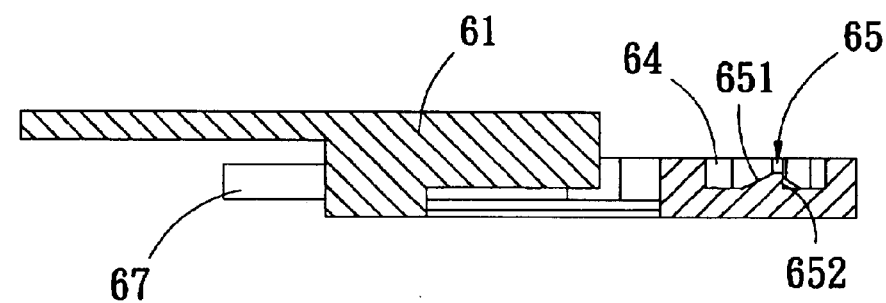
FIG. 5A is a cross sectional view of the above mentioned connecting arm of the preferred embodiment of the present invention.
Figure 5B:
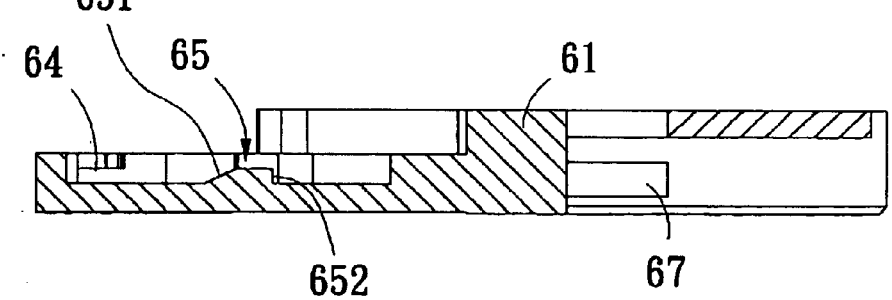
FIG. 5B is another cross sectional view of the above mentioned connecting arm of the preferred embodiment in accordance with the present invention.

The card advancing/withdrawing mechanism 40 is installed on one sidewall 22 of the insulation base seat 20 for limiting the memory card advancing/withdrawing at the opening end 25. The card advancing/withdrawing mechanism comprises a connecting rod 50 and a connecting arm 60. Two ends of the connecting rod respectively have a convex as a first locating and second locating blocks (51, 52). The connecting arm 60 is L-shaped and is formed as an integral. It possesses a longitudinal part 61 and a transverse part 62, which perpendicularly extends from one end of the longitudinal part 61. There are two guide grooves 63 at the lower end of the transverse part 62 for covering on the convex guide block 26. A guide groove 64 with a heart-shaped and closed loop is formed at the upper end of the longitudinal part 61. Several convex blocks 65 are installed at the bottom of the guide groove 64. One end of each convex block 65 is an inclined plane 651, and the other end is a stop part 652 (as shown in FIGS. 5~5B). A long groove 66 is formed at one end of the bottom of the longitudinal part 61 of the connecting arm 60, and a circular rod 67 is installed at the other end. The circular rod 67 matches with the fixing rod 223 of the insulation base seat 20 to locate a spring 68. Besides, an elastic plate 69 extends from one side of the longitudinal part 61 for clamping the memory card.

When the guide groove 63 of the transverse part 62 covers on the convex guide block 26 and the long groove 66 on the bottom of the longitudinal part 61 matches with the guide rail 221, the first locating block 51 is limited and located in the first locating part 222 of the insulation base seat 20 and the second locating block 52 of the connecting rod 50 is inserted in the heart-shaped guide groove 64 of the connecting arm 60. When the memory card advancing/withdrawing, the second locating block 52 limits the connecting arm 60 single cyclical direction moving along on the guide rail 221.

The plurality of conductive terminals 70 can be inserted in the receiving groove 261 of the convex guide blocks 26 from the rear side of the insulation base seat 20. The front end of the conductive terminals 70 is a contact part 71 for electrically contacting with the memory card. The rear ends of the conductive terminals 70 are soldered on the electric circuit board (not shown in Figs) in assembling process. If there is any conductive terminal 70 not soldered in assembling process, it can be directly further soldered through the rear side afterward.

Figure 6:
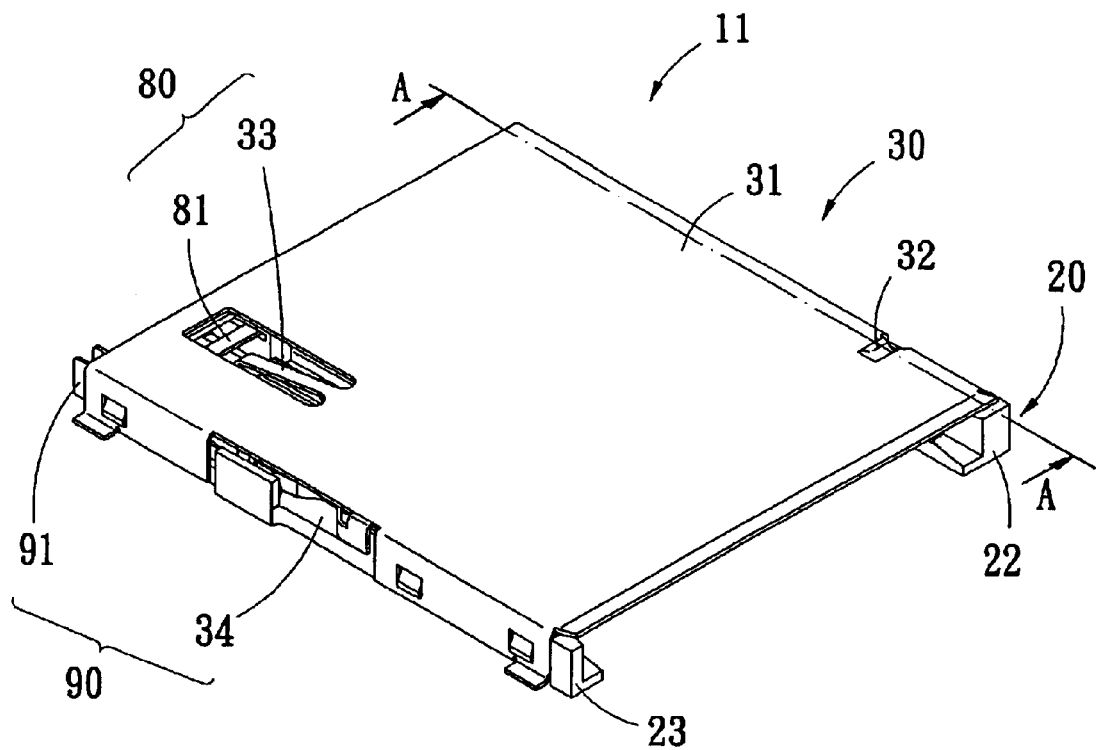
FIG. 6 is an exterior view of a memory card connector of the present invention.
Figure 6A:
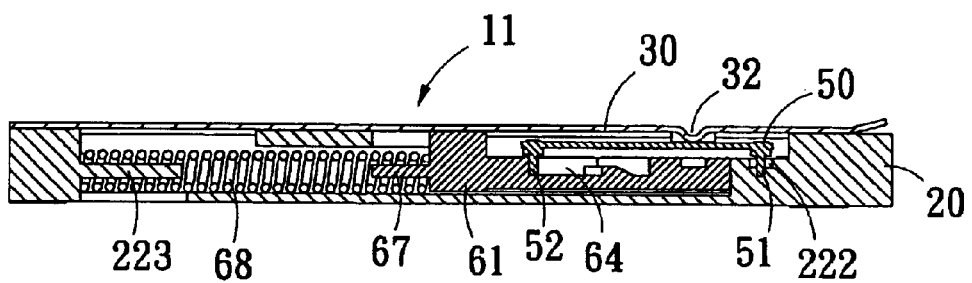
FIG. 6A is a cross sectional view of a memory card connector of the present invention.

Referring to the FIG. 6A that is the cross sectional view of the assembled embodiment according to the present invention, the recess 32 of the shielding shell 30 contacts and presses the upper end of the connecting rod 50, so that there is a small gap between the connecting rod 50 and the shielding shell 30. Hence, the downward and upward movement of the connecting rod 50 is limited in a finite space while the backward and forward movement is not affected. Thereby, the connecting rod 50 cannot be loose easily, and can be backward-forward moved more exactly.

Figure 7:
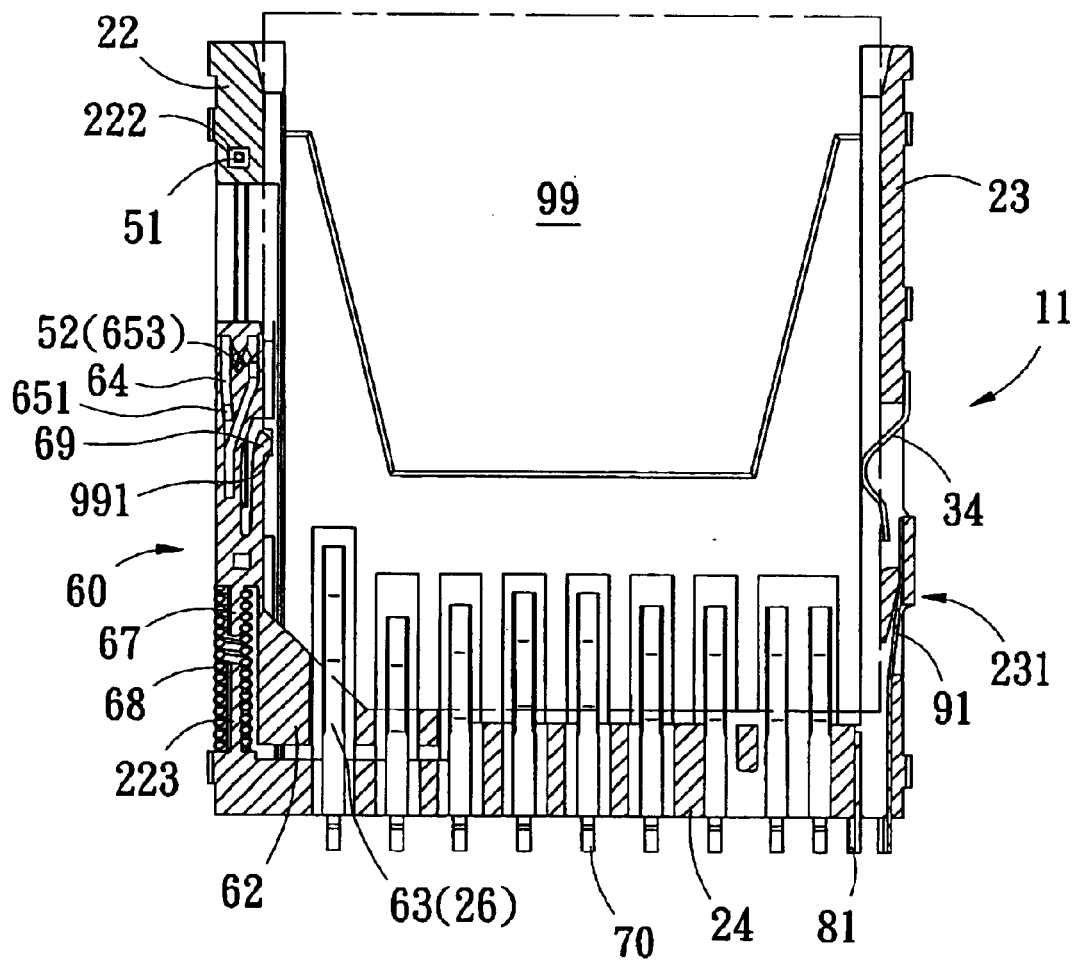
FIG. 7 is a state view showing a memory card inserted in the memory card connector of the present invention.
Figure 8:
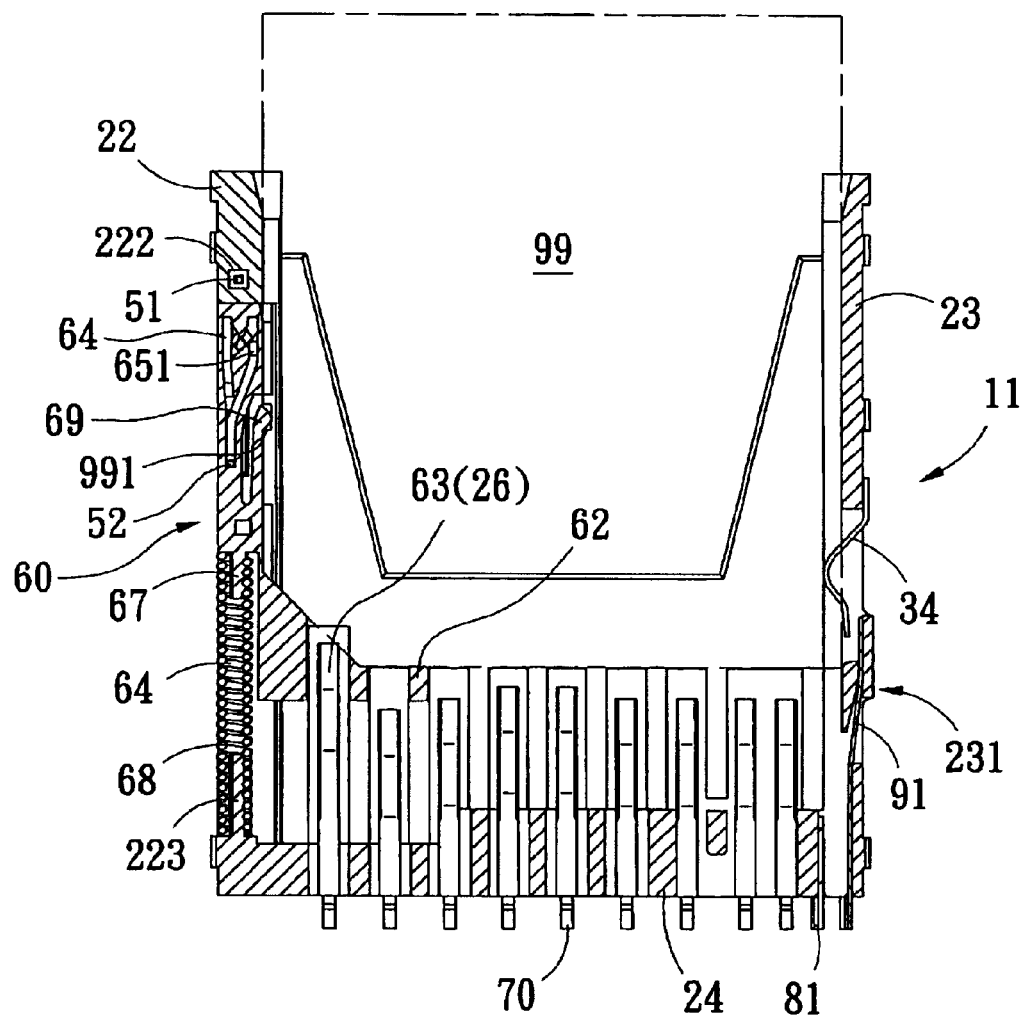
FIG. 8 is a state view showing a memory card removed from the memory card connector of the present invention.

Referring to FIG. 7, when the memory card 99 is pushed into the connector 11 from the open end 25 of the insulation base seat 20, the elastic plate 69 of the connecting arm 60 contact presses the gap 991 on one side of the memory card 99 to make the memory card 99 and the connecting arm 60 move together. The first locating block 51 on one end of the connecting rod 50 is located at the locating part 222 of the insulation base seat 20 and the second locating block 52 of the connecting rod 50 is placed in the heart-shaped guide groove 64 of the connecting arm 60, therefore the connecting arm 60 of the card advancing/withdrawing mechanism 40 can move relatively and can be blocked at an apex 653 by the guiding of the inclined plane 651 of the convex block 65, the spring 68 is in pressed state at this moment. When the memory card 99 is pushed again, the connecting arm 60 can be return by releasing the spring 68. Meanwhile, the second locating block 52 in the heart-shaped guiding groove 64 can back to the starting place through the other guiding path by the guiding of the other different inclined plane 651. Consequently, the connecting arm 60 can push the memory card 99 out the connector 11 (as shown in FIG. 8).

Therefore, the present invention has the following advantages:

1. The connecting arm of the card advancing/withdrawing mechanism of the present invention comprises a long groove, a heart-shaped guiding groove with guiding function, and an elastic plate for clamping memory card, integrated formed. The present invention has the features of compact constituent parts, multiple functions, lower manufacturing cost, and faster assembly.

2. When the memory card is pushed in the connector, the guide groove of the connecting arm and the convex guide block are limit each other so that the connecting arm is able to move smoothly and avoid a tongue.

3. The plurality of conductive terminals of the present invention are inserted in the receiving groove of the convex guide blocks from the rear side of the insulation base seat, and the rear ends of the conductive terminals are located outside the connector. When said a plurality of conductive terminals soldering to the electric circuit board is failed, furthermore soldered by human labor through the rare side is easily. The shielding shell does not need any opening for further soldering, that makes the whole structure is stronger. As stated above, the present invention does accomplish its objects. The present invention has the features of compact constituent parts, low cost, and automatically locating and withdrawing memory cards. Therefore, the present invention has the utilization value in industry. It does be a new and useful invention.

What is claimed is:

1. A memory card connector comprising:

an insulation base seat with a bottom, two parallel sidewalls extending upwards from the bottom, a rear sidewall connecting the corresponding end of the two sidewalls, an open front end opposite to the rear sidewall, on the rear side of the bottom of the insulation base seat there being a plurality of parallel convex guide blocks, and on one sidewall of the base seat there being a guide rail and a locating part;

a shielding shell covering on the insulation base seat;

a plurality of conductive terminals, one end of each of them connected to the convex guide block, the other end protruding out from the rear side of the insulation base seat;

a detecting means connected to the rear end of the connector for detecting the clamping situation of the memory card;

a writing-protection detecting means connected to one side of the connector for detecting whether the memory card being writing-protection or not; and a card advancing/withdrawing mechanism installed on the same sidewall of the insulation base seat as the guide rail on, said advancing/withdrawing mechanism including a connecting rod and a connecting arm, said connecting arm being L-shaped, formed as integral and having a longitudinal part and a transverse part, the bottom of the transverse part having a plurality of guide grooves for covering the convex guide blocks, a guide groove with closed loop, having a bottom which includes several convex blocks, one end of said convex block being an inclined plane and the other end of said convex block being provided with a stop part for guiding and limiting the moving direction of the locating bock, being formed on the upper end of the longitudinal part of the connecting arm, the bottom of the longitudinal part having a long groove for linking the guide rail and letting the connecting arm be able to move on the guide rail, an elastic plate extending out from one side of the longitudinal part of the connecting arm for clamping the memory card and letting the memory card be able to advancing/withdrawing, said connecting rod being installed above the longitudinal part of the connecting arm, a first locating block and a second locating block respectively being installed on the two ends of the connecting rod, said first locating block being located at the locating part, said second locating block being installed in the guide groove which is limited by the second locating block in such a manner that the connecting arm being able to move together with the memory card and along a single cyclical direction in the advancing/withdrawing process of the memory card.

2. A memory card connector as claimed in claim 1, wherein a receiving groove is formed on said convex guide block for the conductive terminals being inserted in from the rear side of the insulation base seat, and if there is any conductive terminal not soldered in assembling process, it is able to be soldered again directly from the rear side.

3. A memory card connector as claimed in claim 1, wherein said locating part is a concave groove with downward step shape.

4. A memory card connector as claimed in claim 1, wherein said shielding shell is provided with a recess for pressing the upper end of the connecting rod in such a manner that the connecting rod is not able to loosen easily and is able to move only in a finite space.

5. A memory card connector as claimed in claim 1, wherein said detecting means comprises a detecting press plate on the shielding shell and a detecting plate affixed to one side of the insulation base seat; and said writing-protection detecting means is assembled by a detecting elastic plate on one side of the shielding shell and a detecting terminal affixed to one side of the insulation base seat.

6. A memory card connector as claimed in claim 1, wherein the guide groove with the closed loop is heart-shaped.

* * * * *